(12) United States Patent
Abe

(10) Patent No.: US 7,284,365 B2
(45) Date of Patent: Oct. 23, 2007

(54) ELECTRIC HEATED CATALYST FAILURE DIAGNOSTIC DEVICE

(75) Inventor: Kunihiro Abe, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 34 days.

(21) Appl. No.: 11/140,950

(22) Filed: Jun. 1, 2005

(65) Prior Publication Data

US 2005/0268596 A1 Dec. 8, 2005

(30) Foreign Application Priority Data

Jun. 4, 2004 (JP) ............................. 2004-167727

(51) Int. Cl.
*F01N 3/00* (2006.01)
*F01N 3/10* (2006.01)
(52) U.S. Cl. .............................. 60/277; 60/300; 60/303
(58) Field of Classification Search ................. 60/277, 60/300, 303; 422/174
See application file for complete search history.

(56) References Cited

U.S. PATENT DOCUMENTS

| 5,257,501 | A | * | 11/1993 | Wataya | 60/284 |
| 5,447,696 | A | * | 9/1995 | Harada | 422/174 |
| 5,555,725 | A | * | 9/1996 | Shimasaki et al. | 60/277 |
| 5,746,053 | A | * | 5/1998 | Hibino | 60/277 |
| 5,758,492 | A | * | 6/1998 | Kato et al. | 60/274 |
| 5,819,531 | A | * | 10/1998 | Kato et al. | 60/277 |
| 6,207,937 | B1 | * | 3/2001 | Stoddard et al. | 219/497 |
| 6,211,495 | B1 | * | 4/2001 | Stoddard et al. | 219/497 |
| 6,355,912 | B2 | * | 3/2002 | Allard | 219/481 |
| 6,555,796 | B1 | * | 4/2003 | Cusack | 219/481 |
| 6,989,978 | B2 | * | 1/2006 | Hiraku et al. | 361/86 |

FOREIGN PATENT DOCUMENTS

| JP | 7-42541 | 2/1995 |
| JP | 9-218233 | 8/1997 |

* cited by examiner

*Primary Examiner*—Thomas Denion
*Assistant Examiner*—Loren Edwards
(74) *Attorney, Agent, or Firm*—Smith, Gambrell & Russell, LLP

(57) ABSTRACT

It is an object to provide an electric heated catalyst failure diagnostic device that is compact, lightweight, inexpensive, and can accurately detect a disconnection of the heater and an abnormality in a circuit from the power supply to the heater with a simple configuration. When an ECU orders to apply the current to a heater drive circuit, a heater failure diagnostic device applies the current to the heater and the heater drive circuit. If energizing via a diode, the heater failure diagnostic device determines the circuit is abnormal. If not so, the circuit is normal. Meanwhile, when the ECU orders not to apply the current to the heater drive circuit, the heater failure diagnostic device turns on electricity to the heater and the heater drive circuit. If energizing via the diode, the heater failure diagnostic device determines the heater is not disconnected, and if not so, the heater is disconnected.

10 Claims, 3 Drawing Sheets

FIG. 3

| ECU COMMAND | Tr1 | R0y | HEATER | Dy | Tr2 | A | B | C | D | E | F | G |
|---|---|---|---|---|---|---|---|---|---|---|---|---|
| ON | ON | ON | 42V | NOT ENERGIZED | ON | H | L | L | L | H | L | L (NORMAL) |
| | ON | UNCLEAR | 0V | ENERGIZED | OFF | H | H | H | L | L | L | H (ABNORMAL) |
| OFF | OFF | OFF | 0V | ENERGIZED | OFF | L | H | L | H | L | L | L (NORMAL) |
| | OFF | OFF | DISCONNECTED | NOT ENERGIZED | ON | L | L | L | H | H | H | H (ABNORMAL) |

ELECTRIC HEATED CATALYST FAILURE DIAGNOSTIC DEVICE

CROSS REFERENCE TO RELATED APPLICATIONS

The disclosure of Japanese Application No. 2004-167727 filed on Jun. 4, 2004 including the specification, drawings and abstract is incorporated herein by reference in its entirety.

BACKGROUND OF THE INVENTION

1. Field of the Invention

The present invention relates to an electric heated catalyst failure diagnostic device that uses a high voltage to efficiently heat a catalyst in a vehicle, for example a equipped with a 42-V power supply system.

2. Description of the Related Art

A device is known where, in a vehicle such as an automobile, an electric heated catalyst is disposed in an exhaust system for the purpose of cleaning exhaust gas at the time the engine is started. Because a catalyst is heated by electricity before engine starting, the electrical heated catalyst activates the catalyst early. (e.g., see JP-A-7-42541).

In a vehicle equipped with such an electric heated catalyst, when a failure occurs in a heater of the electric heated catalyst, the catalyst is not heated sufficiently, the activation of the catalyst is delayed, and the capability to clean the exhaust gas deteriorates. Thus, it is necessary to quickly determine failure of the heater.

In order to counter this problem, as disclosed in JP-A-9-218233, it is conceivable to use a load disconnection detector that includes a measurement-use power supply separate from the power-use power supply of loads such as the heater. The detector switches the connection of the power supply with respect to the loads from the power-use power supply to the measurement-use power supply when detecting disconnection of the loads, supplies a current from the measurement-use power supply to the loads, and detects the disconnection of the loads with the current flowing through the loads or the voltages at both ends of the loads.

However, in the disconnection detector according to JP-A-9-218233, there are problems in that the detector becomes complicated, large, heavy, and expensive because a measurement-use power supply with good accuracy is needed. Also, in the disconnection detector according to JP-A-9-218233, there are the problems that only the disconnection of the heater can be detected, and the disconnection detector cannot diagnose abnormality in the circuit from the power supply to the heater.

SUMMARY OF THE INVENTION

The present invention was made in view of these circumstances, and it is an object thereof to provide an electric heated catalyst failure diagnostic device that is compact, lightweight, inexpensive, and can accurately detect disconnection of the heater, and a failure in the circuit from the power supply to the heater, with a simple configuration.

An electric heated catalyst failure diagnostic device pertaining to the present invention includes: an electric heated catalyst having a heater and being disposed in an engine exhaust system to which electricity is supplied by a power supply; heater energizing control means that controls the energizing of the heater; first heater failure detecting means that detects a failure in the circuit from the power supply to the heater of the electric heated catalyst at the time of a command to energize the heater of the electric heated catalyst from the heater energizing control means; and second heater failure detecting means that detect disconnection of the heater at the time of a command not to energize the heater from the heater energizing control means.

The electric heated catalyst failure diagnostic device of the invention is compact, lightweight, inexpensive, and can accurately detect disconnection of the heater and failure in the circuit from the power supply to the heater with a simple configuration.

BRIEF DESCRIPTION OF THE DRAWINGS

FIG. 3 is an explanatory drawing of the operation and voltage of each element and each point in FIG. 2.

DETAILED DESCRIPTION OF THE INVENTION

Figure 1:
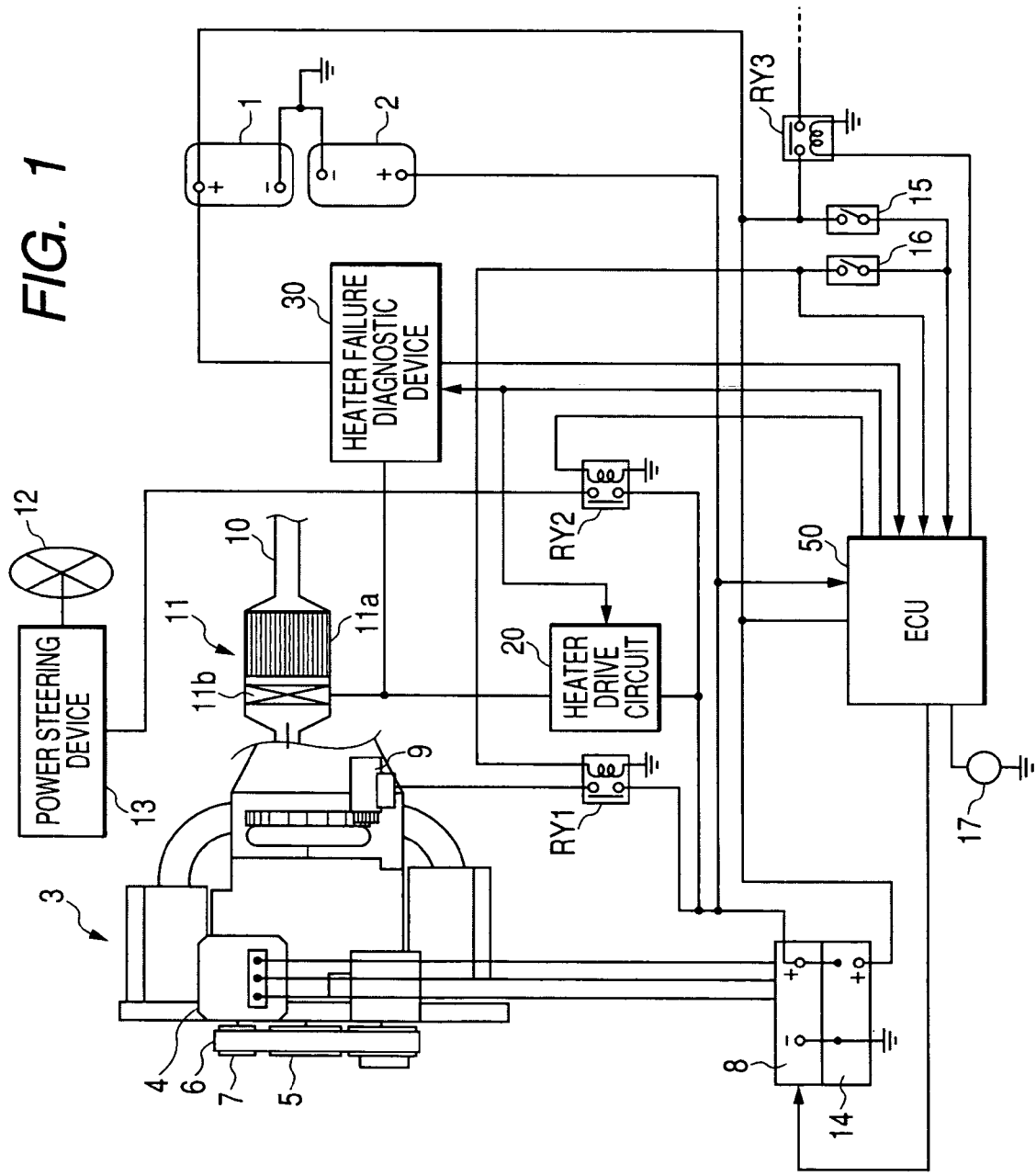
FIG. 1 shows a system block diagram showing a power supply system in an automobile.
Figure 2:
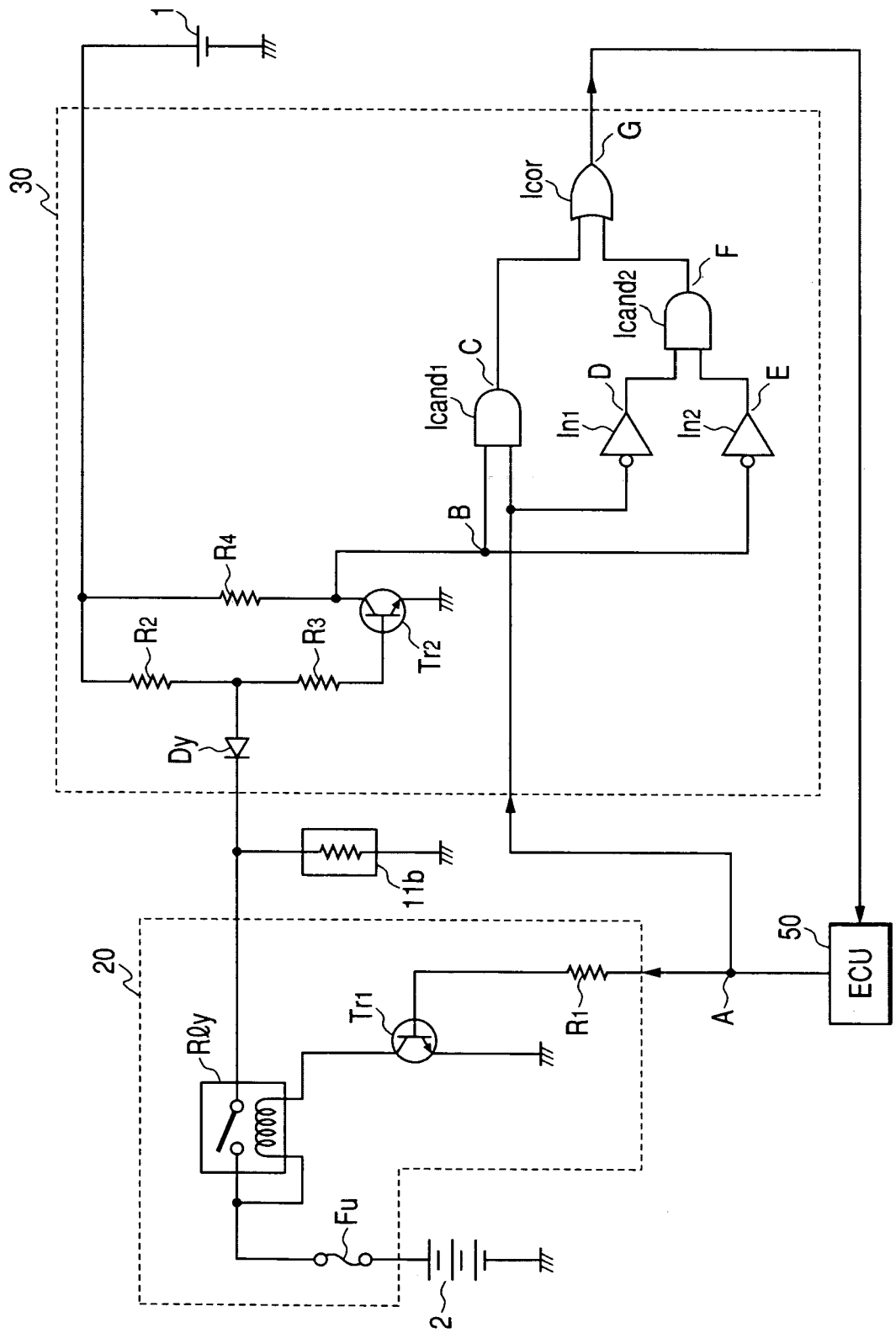
FIG. 2 is an explanatory drawing of for a heater drive circuit and a circuit of a heater failure diagnostic device.

An embodiment of the invention will be described below with reference to the drawings. FIGS. 1 to 3 pertain to the embodiment of the invention. FIG. 1 is a system configuration diagram showing a power supply system for an automobile, FIG. 2 is an explanatory drawing of a heater drive circuit and a circuit of a heater failure diagnostic device, and FIG. 3 is an explanatory drawing of the operation and voltage of each element and each point in FIG. 2.

In FIG. 1, reference numerals 1 and 2 indicate batteries disposed in an automobile. In the present embodiment, the battery 1 is a nominal voltage 12-V battery (voltage at the time the automobile is driven: 14 V), and the battery 2 is a nominal voltage 36-V battery (12 V×3; voltage at the time the automobile is driven: 14 V×3=42 V). Hereinafter, the battery 1 will be referred to as "the low voltage battery," and the battery 2 will be referred to as "the high voltage battery." The voltage system of the low voltage battery 1 will be referred to as "the 14-V system," and the voltage system of the high voltage battery 2 will be referred to as "the 42-V system."

In the present embodiment, the high voltage battery 2 is charged by a motor generator 4 disposed in an engine 3. A pulley 7 at the end portion of a rotary shaft is coupled to a crank pulley 5 of the engine 3 via a belt 6. The motor generator 4 is rotated by the engine 3 to generate electricity. Also when the automobile is started after idling has stopped, the motor generator 4 drives the engine 3 to restart the engine 3. The motor generator 4 is electrically connected to an inverter 8.

A wire of the 42-V system with the high voltage battery 2 is connected to a terminal of the 42-V side of the inverter 8, and loads requiring a large amount of electrical power are connected to this wire o. Examples of loads requiring a large amount of electrical power include a starter motor 9 that is used only when the engine 3 is initially started, a heater-heated electric heated catalyst 11 disposed in an exhaust pipe 10 of the engine 3, and a power steering device 13 that generates steering assist power during operation of a steering wheel 12 by the driver. The starter motor 9 and the power steering device 13 are connected to the wire of the 42-V system via relay contacts (normally open contacts) of relays RY1 and RY2, and the electric heated catalyst 11 is connected to the wire of the 42-V system via a heater drive circuit 20.

In the present embodiment, the electric heated catalyst 11 is configured to include a catalyst 11a, which cleans the exhaust gas of the engine 3, and a heater 11b, which includes a honeycomb path disposed directly upstream of the catalyst 11a. The electric heated catalyst 11 energizes the heater 11b when the engine is cold to heat the exhaust gas passing through the heater 11b and improve the early activation of the catalyst 11a. The heater 11b is an ordinary electric resistance heater, whereby costs can be reduced with a simple configuration.

A resistance value of the heater 11b is set to a rated value that is smaller than the rated value of the continuous energization from the high voltage power supply of the 42-V system. For a short time during an early energization stage, a heater drive circuit 20 supplies electricity more than the rated value to the heater 11b, and catalyst 11a is heated quickly. Afterwards, the heater drive circuit 20 inhibits an energization current by means of a chopper control, and current consumption is reduced. Thus, battery voltage drop can be controlled and affects on in-vehicle devices can be avoided.

A later-described heater failure diagnostic device 30 is electrically connected between the heater 11b and the heater drive circuit 20.

In the present embodiment, the power steering device 13 is configured to include an electrically-operated motor, which is coupled to the steering mechanism of the steering wheel 12, and a drive circuit, which drive-controls the electrically-operated motor. The power steering device 13 generates assist power with the rotational torque of the electrically-operated motor. By supplying power from the 42-V system to the power steering device 13, not only the consumed current can be reduced in comparison to the case using a conventional 14-V system power, but a greater assist power can be obtained while avoiding affects on other loads resulting from a battery voltage drop.

The electric heated catalyst 11 may be one where the catalyst is retained in the surface of a porous conductor and the catalyst retainer is used as an electric resistance heater. Also, the power steering device 13 may be one that uses hydraulic pressure generated by an electrically-operated pump to generate the assist power.

As the voltage system of the low voltage 14-V system, a DC-DC converter 14 that converts a 42-V voltage to a 14-V voltage is connected to the inverter 8. The low voltage battery 1 is connected to the DC-DC converter 14, and the heater failure diagnostic device 30 and low voltage loads (14-V loads) such as various kinds of lamps and audio not shown are connected to the DC-DC converter 14 via a relay contact (normally open contact) of a relay RY3.

The inverter 8, the heater drive circuit 20, and the relays RY1 to RY3 are controlled by an electronic control unit (ECU) 50. The ECU 50 is configured to include a microcomputer and peripheral circuits such as constant voltage circuits and input/output circuits. The ECU 50 conducts control of the engine 3, idle stop control that executes automatic stopping and restarting of the engine 3, control of the energizing of the electric heated catalyst 11 via the heater drive circuit 20, steering assist control via the power steering device 13, control of the motor generator 4 via the inverter 8, and mainly management of the charge and discharge state of the high voltage battery 2. Namely, the ECU 50 is configured to include a function as a heater energizing control means.

In FIG. 1, the ECU 50 is shown as a single unit including plural control functions, but these control functions may be dispersed among plural units that are interconnected via a communication line.

The power of the 14-V system is supplied to the constant voltage circuit of the ECU 50, and the ECU 50 operates at a predetermined stable constant voltage. Signals from an ignition switch 15, a start switch 16 and other various kinds of switches not shown, a signal from the heater failure diagnostic device 30, signals from various kinds of sensors not shown, and a monitor voltage of the high voltage battery 2 are inputted to an input side of the ECU 50.

The inverter 8, the heater drive circuit 20, the heater failure diagnostic device 30, the relays RY1 to RY3, and various kinds of actuators that operate on 14 V and are disposed in the engine 3 are connected to the output side of the ECU 50. Moreover, an alarm device 17 for issuing an alarm to the driver using light or sound when the heater failure diagnostic device 30 has detected a failure in the heater 11b, or when the heater failure diagnostic device 30 has detected a failure such as a voltage drop while monitoring the voltage of the 42-V system, is connected to the output side of the ECU 50.

Next, the details of a circuit configuration of the heater 11b, the heater drive circuit 20, the heater failure diagnostic device 30 and the ECU 50 will be described with reference to FIG. 2.

The heater drive circuit 20 comprises a relay Rly, an NPN transistor Tr1, a resistor R1, and a fuse Fu. The high voltage battery 2 is connected to one terminal of a make contact of the relay Rly and one coil terminal of the relay Rly via the fuse Fu.

A signal from the ECU 50 is outputted to a base of the NPN transistor Tr1 via the resistor R1, and a collector of the NPN transistor Tr1 is connected to the other coil terminal of the relay Rly.

The other terminal of the make contact of the relay Rly is connected to the heater 11b and to a cathode of a diode Dy of the heater failure diagnostic device 30.

The heater failure diagnostic device 30 comprises the diode Dy, an NPN transistor Tr2, resistors R2, R3 and R4, inverter circuits In1 and In2, AND circuits Icand1 and Icand2, and an OR circuit Icor.

The cathode of the diode Dy is connected to the other terminal of the make contact of the relay Rly of the heater drive circuit 20 and to the heater 11b. An anode of the diode Dy is connected to the low voltage battery 1 via the resistor R2 and to a base of the NPN transistor Tr2 via the resistor R3. The value of the resistor R2 is far larger than that of the heater 11b (e.g., if the resistance value of the heater 11b is 1 Ω, then the value of the resistor R2 is 10 kΩ).

The low voltage battery 1 is connected, via the resistor R4, to a collector of the NPN transistor Tr2, to one input of the AND circuit Icand1, and to the input of the inverter circuit In2.

The inputted signal from the ECU 50 to the heater failure diagnostic device 30 consists of the other input of the AND circuit Icand1 and to the input of the inverter circuit In1.

The outputs of the inverter circuits In1 and In2 are inputted to the inputs of the AND circuit Icand2. The output of the AND circuit Icand2 is outputted to one input of the OR circuit Icor. The output of the AND circuit Icand1 is outputted to the other input of the OR circuit Icor. The output of the OR circuit Icor is outputted to the ECU 50.

Operation of the circuit configuration of the heater 11*b*, the heater drive circuit 20, the heater failure diagnostic device 30, and the ECU 50 is described on the basis of FIG. 3.

First, when the ECU 50 issues an energize command with respect to the heater drive circuit 20 in order to energize the heater 11*b*, in a case where the circuit from the high voltage battery 2 to the heater 11*b* is normal, as shown in the first line of FIG. 3, the voltage at a point A in FIG. 2 becomes a high level (H), the NPN transistor Tr1 is turned ON, the coil of the relay Rly is energized, and the switch of the relay Rly is switched ON. Thus, 42 V is applied to the heater 11*b* and the heater 11*b* generates heat.

Then, the diode Dy becomes non-energized, the transistor Tr2 is turned ON, and the voltage of the collector of the transistor Tr2 (i.e., the voltage at a point B) becomes a low level (L).

In this manner, the output (voltage at a point C) becomes a low level (L) because the voltage (L) at the point B and the voltage (H) at the point A are inputted to the AND circuit Icand1.

Also, the voltage (H) at the point A is inputted to the inverter circuit In1, and the output from the inverter circuit In1 (the voltage at a point D) becomes a low level (L). Moreover, the voltage (L) at the point B is inputted to the inverter circuit In2, and the output from the inverter circuit In2 (the voltage at a point E) becomes a high level (H).

The outputs from the inverter circuits In1 and In2 are inputted to the inputs of the AND circuit Icand2, and the output of the AND circuit Icand2 (the voltage at a point F) becomes a low level (L).

Then, the voltage (L) at the point C and the voltage (L) at the point F are inputted to the OR circuit Icor, and the signal (the voltage at a point G) of the low level (L) from the OR circuit Icor is outputted. As a result, it is determined that the circuit from the high voltage battery 2 to the heater 11*b* is normal.

Next, when the ECU 50 issues an energize command with respect to the heater drive circuit 20 in order to energize the heater 11*b*, in a case where there is a failure in the circuit from the high voltage battery 2 to the heater 11*b*, as shown in the second line of FIG. 3, the voltage at the point A in FIG. 2 becomes a high level (H), and the NPN transistor Tr1 is turned ON, but the operation of the relay Rly becomes unknown. Thus, a voltage is not applied to the heater 11*b*.

Then, the diode Dy becomes energized, and the current supplied from the low voltage battery 1 is supplied from the diode Dy to the heater 11*b*. Thus, the transistor Tr2 is switched OFF, and the voltage of the collector of the transistor Tr2 (i.e., the voltage at the point B) becomes a high level (H).

In this manner, the output (the voltage at the point C) becomes a high level (H) because the voltage (H) at the point B and the voltage (H) at the point A are inputted to the AND circuit Icand1.

Also, the voltage (H) at the point A is inputted to the inverter circuit In1, and the output from the inverter circuit In1 (the voltage at the point D) becomes a low level (L) Moreover, the voltage (H) at the point B is inputted to the inverter circuit In2, and the output from the inverter circuit In2 (the voltage at the point E) becomes a low level (L).

The outputs from the inverter circuits In1 and In2 are inputted to the inputs of the AND circuit Icand2, and the output of the AND circuit Icand2 (the voltage at the point F) becomes a low level (L).

Then, the voltage (H) at the point C and the voltage (L) at the point F are inputted to the OR circuit Icor, and the signal (the voltage at a point G) of the high level (H) is outputted from the OR circuit Icor. As a result, it is determined that there is a failure in the circuit from the high voltage battery 2 to the heater 11*b*.

In this manner, the heater drive circuit 20 and the heater failure diagnostic device 30 include a function as a first heater abnormality detecting means.

Next, when the ECU 50 issues a non-energize command with respect to the heater drive circuit 20 in order not to energize the heater 11*b*, in a case where the heater 11*b* is not disconnected and is normal, as shown in the third line of FIG. 3, the voltage at the point A in FIG. 2 becomes a low level (L), the NPN transistor Tr1 is turned OFF, the coil of the relay Rly becomes not energized, and the switch of the relay Rly is switched OFF. Thus, a voltage is not applied to the heater 11*b*.

Then, the diode Dy becomes energized, and the current supplied from the low voltage battery 1 is supplied from the diode Dy to the heater 11*b*. Thus, the transistor Tr2 is turned OFF, and the voltage of the collector of the transistor Tr2 (i.e., the voltage at the point B) becomes a high level (H).

In this manner, the output (the voltage at the point C) becomes a low level (L) because the voltage (H) at the point B and the voltage (L) at the point A are inputted to the AND circuit Icand1.

Also, the voltage (L) at the point A is inputted to the inverter circuit In1, and the output from the inverter circuit In1 (the voltage at the point D) becomes a high level (H). Moreover, the voltage (H) at the point B is inputted to the inverter circuit In2, and the output from the inverter circuit In2 (the voltage at the point E) becomes a low level (L).

The outputs from the inverter circuits In1 and In2 are inputted to the inputs of the AND circuit Icand2, and the output of the AND circuit Icand2 (the voltage at the point F) becomes a low level (L).

Then, the voltage (L) at the point C and the voltage (L) at the point F are inputted to the OR circuit Icor, and the signal (the voltage at the point G) of the low level (L) is outputted from the OR circuit Icor. As a result, it is determined that the heater 11*b* is not disconnected and is normal.

Next, when the ECU 50 issues a non-energize command with respect to the heater drive circuit 20 in order not to energize the heater 11*b*, in a case where the heater 11*b* is disconnected, as shown in the fourth line of FIG. 3, the voltage at the point A in FIG. 2 becomes a low level (L), the NPN transistor Tr1 is turned OFF, the coil of the relay Rly becomes not energized, and the switch of the relay Rly is switched OFF. Thus, a voltage is not applied to the heater 11*b*.

Then, the current supplied from the low voltage battery 1 cannot energize the heater 11*b* because of the disconnection of the heater 11*b*. Thus, the diode Dy becomes not energized, the transistor Tr2 is turned ON, and the voltage of the collector of the transistor Tr2 (i.e., the voltage at the point B) becomes a low level (L).

In this manner, the output of the AND circuit Icand1 (the voltage at the point C) becomes a low level (L) because the voltage (L) at the point B and the voltage (L) at the point A are inputted to the AND circuit Icand1.

Also, the voltage (L) at the point A is inputted to the inverter circuit In1, and the output from the inverter circuit In1 (the voltage at the point D) becomes a high level (H). Moreover, the voltage (L) at the point B is inputted to the inverter circuit In2, and the output from the inverter circuit In2 (the voltage at the point E) becomes a high level (H).

The outputs from the inverter circuits In1 and In2 are inputted to the inputs of the AND circuit Icand2, and the output of the AND circuit Icand2 (the voltage at the point F) becomes a high level (H).

Then, the voltage (L) at the point C and the voltage (H) at the point F are inputted to the OR circuit Icor, and the signal (the voltage at the point G) of the high level (H) is outputted from the OR circuit Icor. As a result, it is determined that the heater 11b is disconnected.

In this manner, the heater drive circuit 20 and the heater failure diagnostic device 30 include a function as a second heater abnormality detecting means.

In this manner, according to the embodiment of the present invention, abnormality of the circuit from the high voltage battery 2 to the heater 11b and disconnection of the heater 11b can be inexpensively detected with a circuit configuration that is compact, lightweight, and simple, without having to dispose a complicated circuit such as a reference power supply.

In the present embodiment, the engine 3 equipped with the motor generator 4 was described as an example, but the invention may also be configured to include an alternator rather than a motor generator, so that the rectifier current of the alternator is supplied to the high voltage battery 2, to the electric heated catalyst 11 and the power steering device 13 of the 42-V system, and also supplied to the low voltage battery 1 of the 14-V system and various loads via the DC-DC converter 14.

Also, the various kinds of circuit elements described in the heater failure diagnostic device 30 are not limited to those in the present embodiment and may be of other circuit configurations.

Moreover, the heater failure diagnostic device 30 may be integrally configured with the heater drive circuit 20 or integrally configured with the ECU 50.

What is claimed is:

1. An electric heated catalyst failure diagnostic device comprising:
    an electric heated catalyst having a heater and being disposed in an engine exhaust system to which electricity is supplied by a power supply;
    control means, the control means controlling energizing of the heater of the electric heated catalyst;
    heater abnormality detecting means for detecting first and second heater abnormalities, the detecting means detecting
        a first abnormality that is an abnormality in a circuit from the power supply to the heater when the control means issues a command to energize the heater, and
    a second abnormality that is a disconnection abnormality of the heater when the control means issues a command not to energize the heater; and
    a heater energize command detector for detecting the command from the control means not to energize the heater,
    wherein the heater abnormality detecting means is activated when the heater energizing command detector detects the command from the control means not to energize the heater.

2. The electric heated catalyst failure diagnostic device of claim 1, wherein the heater abnormality detecting means detects:
    the first abnormality based on the status of an energizing current to the heater from the heater abnormality detecting means, and the status of a command signal from the control means, and
    the second abnormality based on the status of an energizing current to the heater from the abnormality detecting means, and the status of a command signal from the control means.

3. The electric heated catalyst failure diagnostic device according to claim 1, further comprising:
    a high voltage battery, and
    a low voltage battery,
    wherein the power supply is the high voltage battery.

4. The electric heated catalyst failure diagnostic device according to claim 3,
    wherein the heater abnormality detecting means is driven by the low voltage battery.

5. The electric heated catalyst failure diagnostic device according to claim 4, further comprising:
    an ECU;
    a heater drive circuit, and
    a heater failure diagnostic device,
    wherein the control means is formed by the ECU and the heater drive circuit, and the heater failure diagnostic device is formed by the ECU and the heater abnormality detecting means.

6. The electric heated catalyst failure diagnostic device according to claim 1 further comprising:
    a heater energize command detector for detecting the command from the control means to energize the heater, wherein
    the heater abnormality detecting means is activated when the heater energizing command detector detects the command from the control means to energize the heater.

7. An electric heated catalyst failure diagnostic device comprising:
    an electric heated catalyst having a heater and being disposed in an engine exhaust system to which electricity is supplied by a power supply;
    control means, the control means controlling energizing of the heater of the electric heated catalyst:
    heater abnormality detecting means for detecting first and second heater abnormalities, the detecting means detecting
        a first abnormality that is an abnormality in a circuit from the power supply to the heater when the control means issues a command to energize the heater, and
        a second abnormality that is a disconnection abnormality of the heater when the control means issues a command not to energize the heater;
    a high voltage battery;
    a low voltage battery;
    an ECU;
    a heater drive circuit; and
    a heater failure diagnostic device,
    wherein the control means is formed by the ECU and the heater drive circuit, and the heater failure diagnostic device is formed by the ECU and the heater abnormality detecting means,
    wherein the heater abnormality detecting means is driven by the low voltage battery,
    wherein the power supply is the high voltage battery, and
    wherein the heater failure diagnostic device comprises:
        a diode Dy,
        an NPN transistor Tr2,
        a resistor R2, R3 and R4,
        inverter circuits In1 and In2,
        AND circuits Icand1 and Icand2, and
        an OR circuit Icor, wherein
        a cathode of the diode Dy is connected to the heater, an anode of the diode Dy is connected to the low voltage battery via the resistor R2 and to a base of the NPN transistor Tr2 via the resistor R3, the low voltage battery is connected, via the resistor R4, to a collector of the NPN transistor Tr2, to one input of the AND circuit Icand1, and to an input of the inverter circuit In2, the ECU is connected to the other input of the AND circuit Icand 1 and to an input of the inverter circuit In1, outputs of the inverter circuits In1 and In2 are connected to inputs of the AND circuit Icand2, an output of the AND circuit Icand2 is connected to one input of the OR circuit Icor, an output of the AND circuit Icand1 is connected to the other input of the OR circuit Icor, and an output of the OR circuit Icor is outputted to the ECU.

8. The electric heated catalyst failure diagnostic device according to claim 7, wherein a resistance value of the resistor R2 is larger than that of the heater.

9. The electric heated catalyst failure diagnostic device according to claim 7, wherein the heater drive circuit comprises:

a relay Rly;
a first NPN transistor Tr1, and
a resistor R1, wherein the high voltage battery is connected to one terminal of a make contact of the relay Rly and one coil terminal of the relay Rly, a base of the NPN transistor Tr1 is connected to the ECU via the resistor R1, a collector of the NPN transistor Tr1 is connected to the other coil terminal of the relay Rly, and the other terminal of the make contact of the relay Rly is connected to the heater and to the cathode of the diode Dy of the heater failure diagnostic device.

10. An electric heated catalyst failure diagnostic device comprising:

an electric heated catalyst having a heater and being disposed in an engine exhaust system to which electricity is supplied by a power supply;

control means, the control means controlling energizing of the heater of the electric heated catalyst;

heater abnormality detecting means for detecting first and second heater abnormalities, the detecting means detecting a first abnormality that is an abnormality in a circuit from the power supply to the heater when the control means issues a command to energize the heater, and a second abnormality that is a disconnection abnormality of the heater when the control means issues a command not to energize the heater;

a high voltage battery;
a low voltage battery;
an ECU;
a heater drive circuit; and
a heater failure diagnostic device, wherein the control means is formed by the ECU and the heater drive circuit, and the heater failure diagnostic device is formed by the ECU and the heater abnormality detecting means, wherein the heater abnormality detecting means is driven by the low voltage battery, wherein the power supply is the high voltage battery, and wherein the heater drive circuit comprises:

a relay Rly;
a NPN transistor Tr1, and
a resistor R1, wherein the high voltage battery is connected to one terminal of a make contact of the relay Rly and one coil terminal of the relay Rly, a base of the NPN transistor Tr1 is connected to the ECU via the resistor R1, a collector of the NPN transistor Tr1 is connected to the other coil terminal of the relay Rly, and the other terminal of the make contact of the relay Rly is connected to the heater.

* * * * *